(12) United States Patent
Frank et al.

(10) Patent No.: US 8,770,899 B2
(45) Date of Patent: Jul. 8, 2014

(54) COUNTERBALANCED BORING TOOL WITH CLAMPING DEVICE

(75) Inventors: Peter Frank, Floh-Seligenthal (DE); Jens Neumann, Wernshausen (DE)

(73) Assignee: Sandvik Intellectual Property AB, Sandviken (SE)

( * ) Notice: Subject to any disclaimer, the term of this patent is extended or adjusted under 35 U.S.C. 154(b) by 1148 days.

(21) Appl. No.: 12/523,466

(22) PCT Filed: Jan. 17, 2008

(86) PCT No.: PCT/EP2008/050526
§ 371 (c)(1),
(2), (4) Date: Oct. 14, 2009

(87) PCT Pub. No.: WO2008/092752
PCT Pub. Date: Aug. 7, 2008

(65) Prior Publication Data
US 2010/0054882 A1    Mar. 4, 2010

(30) Foreign Application Priority Data
Jan. 29, 2007   (DE) .......................... 10 2007 004 383

(51) Int. Cl.
*B23B 47/00*   (2006.01)
(52) U.S. Cl.
CPC ..................................... *B23B 47/00* (2013.01)
USPC ......................................... 408/143; 408/185
(58) Field of Classification Search
USPC ................... 408/143, 181, 184, 185
See application file for complete search history.

(56) References Cited

U.S. PATENT DOCUMENTS

| | | | | |
|---|---|---|---|---|
| 2,452,828 A * | 11/1948 | Bell | | 408/185 |
| 3,704,958 A * | 12/1972 | Gulibon et al. | | 408/153 |
| 4,242,063 A | 12/1980 | Pareja | | |
| 4,626,144 A | 12/1986 | Berner | | |
| 4,878,787 A * | 11/1989 | Hunt | | 408/181 |
| 5,454,667 A * | 10/1995 | Cirino et al. | | 408/181 |
| 5,478,177 A | 12/1995 | Romi | | |
| 5,611,651 A * | 3/1997 | Wohlhaupter et al. | | 408/153 |
| 5,857,811 A | 1/1999 | Kaiser et al. | | |
| 5,909,986 A | 6/1999 | Kaiser et al. | | |
| 2006/0239787 A1 * | 10/2006 | Stadelmann et al. | | 408/124 |

FOREIGN PATENT DOCUMENTS

| | | |
|---|---|---|
| DE | 289 102 | 10/1911 |
| DE | 815 554 | 10/1951 |
| DE | 35 10 259 | 9/1985 |
| DE | 39 36 243 | 5/1991 |

(Continued)

*Primary Examiner* — Andrea Wellington
*Assistant Examiner* — Alan Snyder
(74) *Attorney, Agent, or Firm* — Morgan, Lewis & Bockius LLP

(57) ABSTRACT

The invention concerns a boring tool comprising a main tool body and a tool holder which is adjustable relative thereto, as well as a counterweight coupled to the tool holder in such a way that upon a movement of the tool holder in one direction a movement of the counterweight occurs substantially in the opposite direction, wherein both the tool holder and also the counterweight are respectively arranged at least in part in a bore in the main tool body. To provide a boring tool of the above-mentioned kind which is suitable in particular for high rotary speeds, which is advantageous in terms of manufacture and which in addition provides a reliable precise balancing function, it is proposed in accordance with the invention that the main tool body has a clamping device, by means of which the main tool body can be elastically deformed so that both the tool holder and also the counterweight are respectively clamped in the bore.

14 Claims, 9 Drawing Sheets

(56) References Cited

FOREIGN PATENT DOCUMENTS

Figure 2:
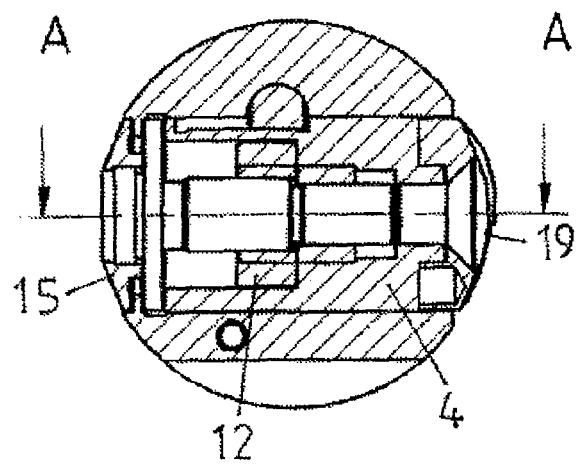

| | | |
|---|---|---|
| EP | 0 791 421 | 8/1997 |
| EP | 0 804 984 | 11/1997 |
| GB | 2 288 997 | 11/1995 |
| JP | 01-171707 | 7/1989 |
| JP | 9-155606 | 6/1997 |
| JP | 9-309010 | 12/1997 |
| JP | 10-291103 | 11/1998 |

* cited by examiner

1

COUNTERBALANCED BORING TOOL WITH CLAMPING DEVICE

The present invention concerns a boring tool with a main tool body, at the end of which there is provided at least one tool holder which is adjustable relative to the main tool body, wherein the tool holder is movable in the radial direction and can be held fast.

Such boring tools are frequently operated at very high rotary speeds so that it is necessary for the boring tool to be balanced prior to operation. As any radial displacement of the tool holder provides for an unbalance, the tool has to be re-balanced after each such displacement. Boring tools are therefore already known having a counterweight which is coupled to the tool holder in such a way that, upon a movement of the tool holder in one direction, there is a movement of the counterweight substantially in the opposite direction, wherein both the tool holder and also the counterweight is respectively arranged at least in part in a bore in the main tool body.

Such a boring tool is known for example from EP 0 804 984. That boring tool has a clamping member which is intended to come into contact simultaneously with the tool holder and the counterweight. That construction is very complicated and expensive to manufacture. In addition in the course of use it can happen that the clamping member no longer comes exactly simultaneously into contact with the counterweight on the one hand and the tool holder on the other hand so that there is possibly a slight unbalance after fine adjustment has been effected.

Therefore, taking that state of the art as the basic starting point, the object of the invention is to provide a boring tool of the above-specified kind, which is suitable in particular for high rotary speeds, which is advantageous in terms of manufacture and which in addition provides a reliable precise balancing function.

That object is attained in that the main tool body has a clamping device, by means of which the main tool body can be elastically deformed so that both the tool holder and also the counterweight are respectively clamped in the bore.

The elastic deformation of the main tool body means that the counterweight and the tool holder are braced in the bore so that the two parts are clamped fast in embracing relationship.

To permit such elastic deformation the main tool body may for example have a slot so that the slot becomes narrower due to the elastic deformation by means of the clamping device.

The clamping device can comprise for example a clamping screw which engages into a screwthreaded bore in the main tool body.

In a particularly preferred feature the clamping device does not come into direct contact either with the tool holder or with the counterweight. That ensures that the tool holder and the counterweight are braced by the bracing action of the main tool body and not by coming into contact with the clamping device, in the main tool body.

In an embodiment the tool holder and counterweight are arranged in two separate bores preferably extending in substantially mutually parallel relationship. Advantageously the tool holder and the counterweight are connected together by way of a connecting element.

The connecting element can be arranged at least partially in the slot which is provided for elastic deformation of the main tool body.

In addition in another embodiment the tool holder and the counterweight are arranged in the same bore in the main tool body.

In a further particularly preferred embodiment there is a guide means for guiding the counterweight in the bore. The guide means serves to ensure exact movement of the counterweight in the bore. The guide means can comprise for example a guide bolt arranged within a bore in the counterweight. The counterweight can thus be moved only in the axial direction along the guide bolt. To prevent rotation of the counterweight about the guide bolt, there can additionally be a guide opening and a guide projection, preferably a guide groove and a guide pin. Desirably the guide opening is provided on the counterweight for the main tool body, preferably on the counterweight, and the guide projection on the other element.

As an alternative thereto, instead of being guided on a guide pin, the counterweight can also be guided in a guide sleeve or a guide bore.

In addition there is provided a screw element having two screwthreads (double screwthread), for the movement of the tool holder in the main tool body, wherein the one screwthread is in engagement with the tool holder and the other screwthread with the counterweight.

As an alternative thereto for the movement of the tool holder there is provided a screw element having a double screwthread, wherein the one screwthread is in engagement with the tool holder and the other screwthread with the connecting element. Finally in a third alternative embodiment it is provided that for the movement of the tool holder there is provided a screw element having a double screwthread, wherein the one screwthread is in engagement with the connecting element and the other screwthread with the counterweight. Accordingly, rotation of the screw element produces an oppositely directed movement of the counterweight on the one hand and the tool holder on the other hand. As the counterweight and the tool holder are possibly of different masses, the two screwthreads can also involve a different pitch so that, with a slight movement of the heavier element, the lighter element moves to a correspondingly greater degree in the opposite direction.

Furthermore a particularly preferred embodiment provides that the tool holder and the counterweight comprise materials of different density, wherein preferably the material of the counterweight is of higher density than the material of the tool holder.

Advantageously at least one screwthread and preferably the screwthread coming into engagement with the tool holder is in the form of a fine screwthread. That permits highly precise balancing.

Figure 1:
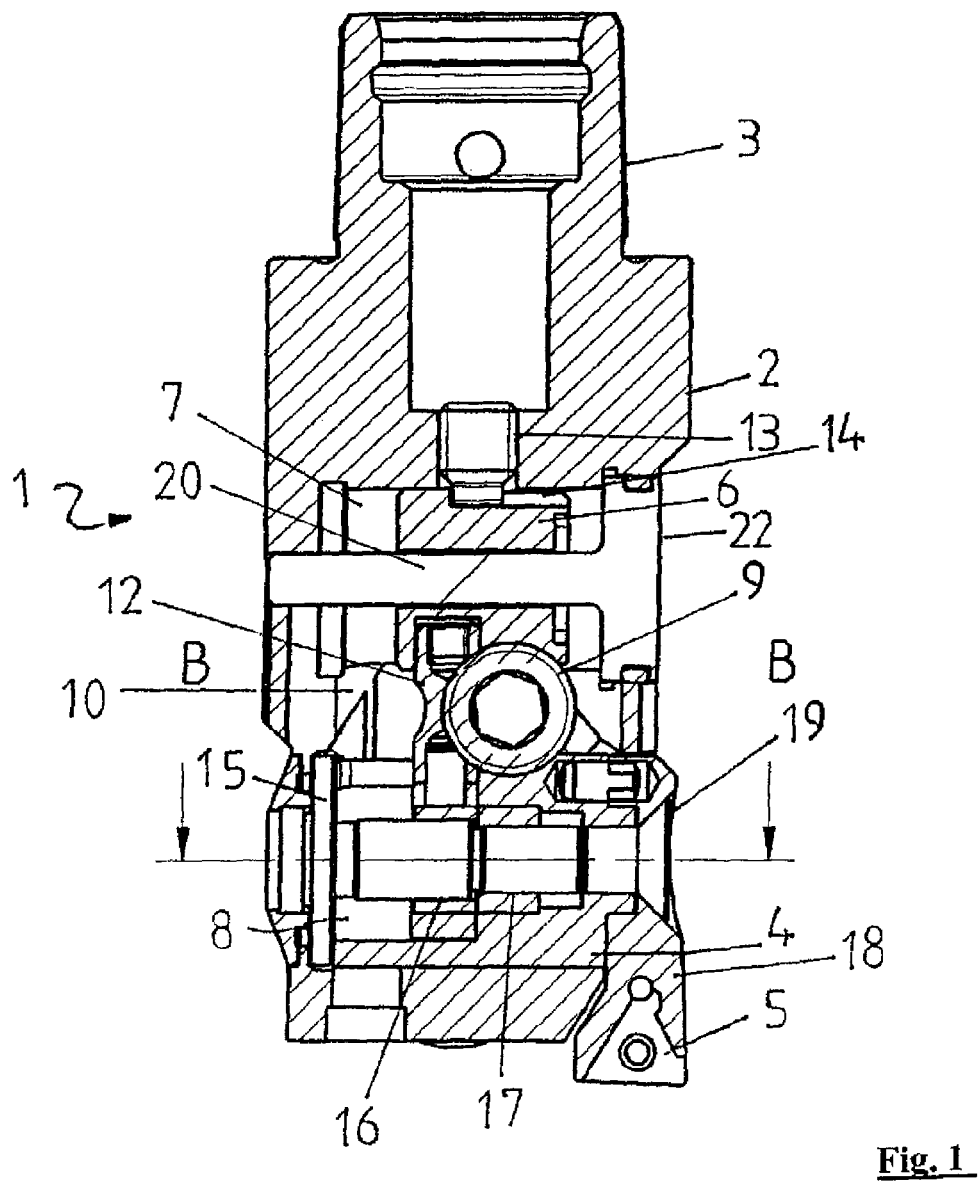
Figure 3:
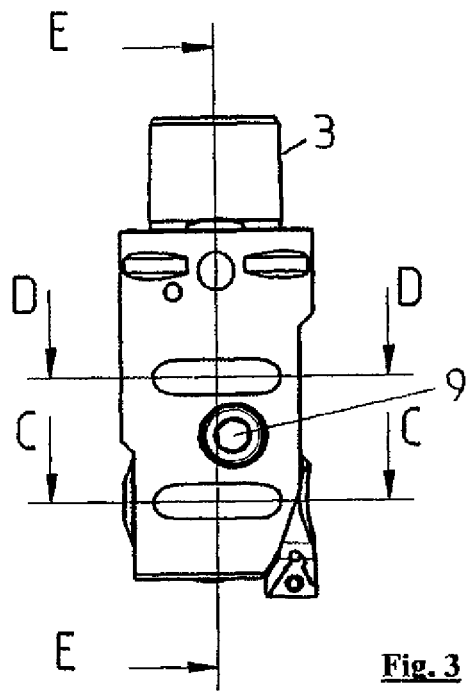
Figure 4:
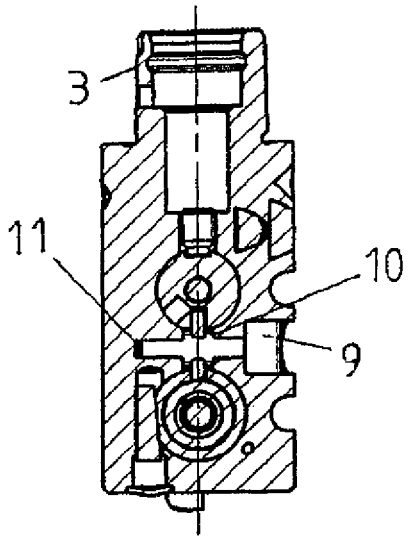
Figure 5:
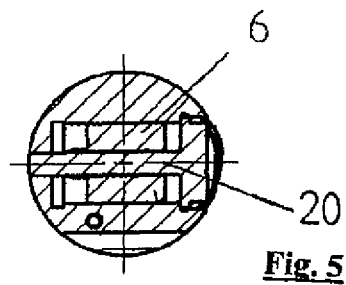
Figure 6:
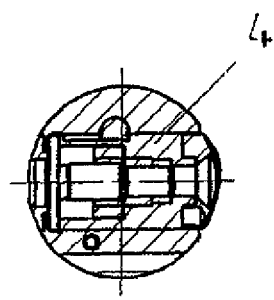
Figure 7:
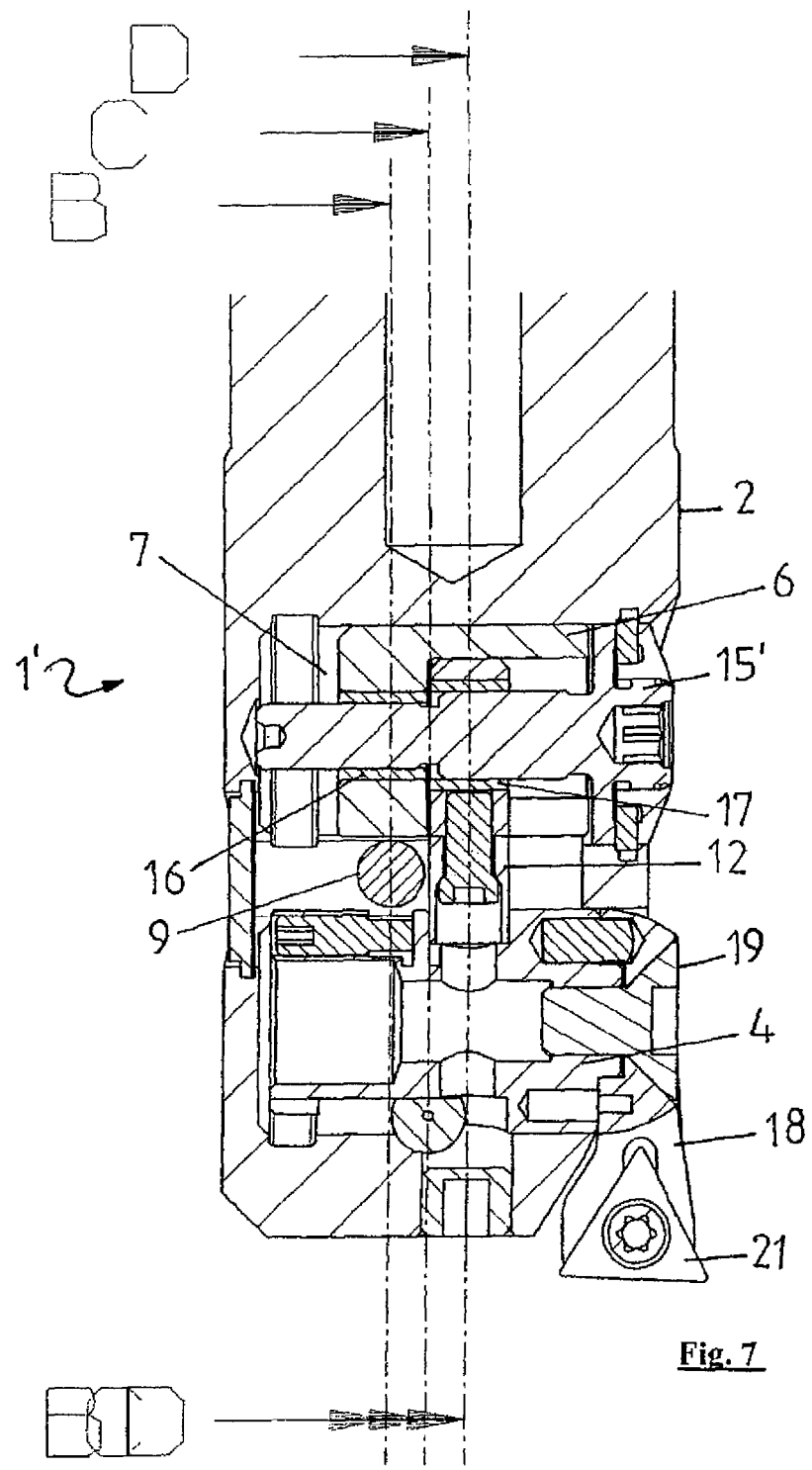
Figure 8:
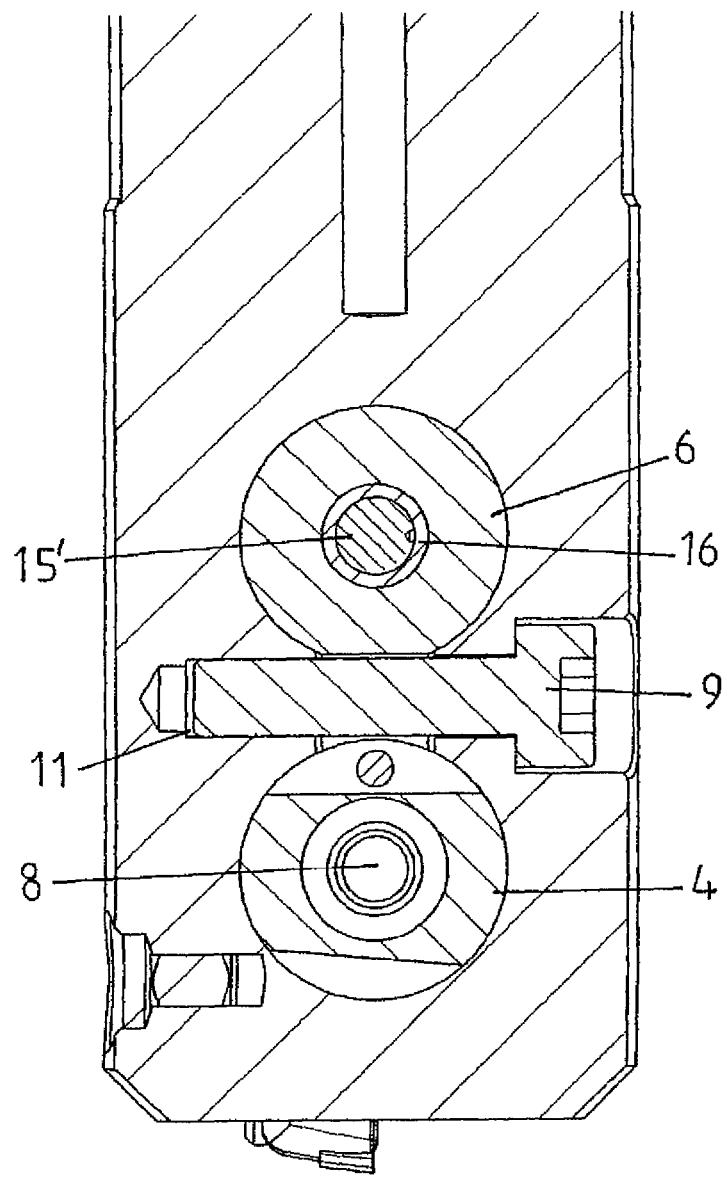
Figure 9:
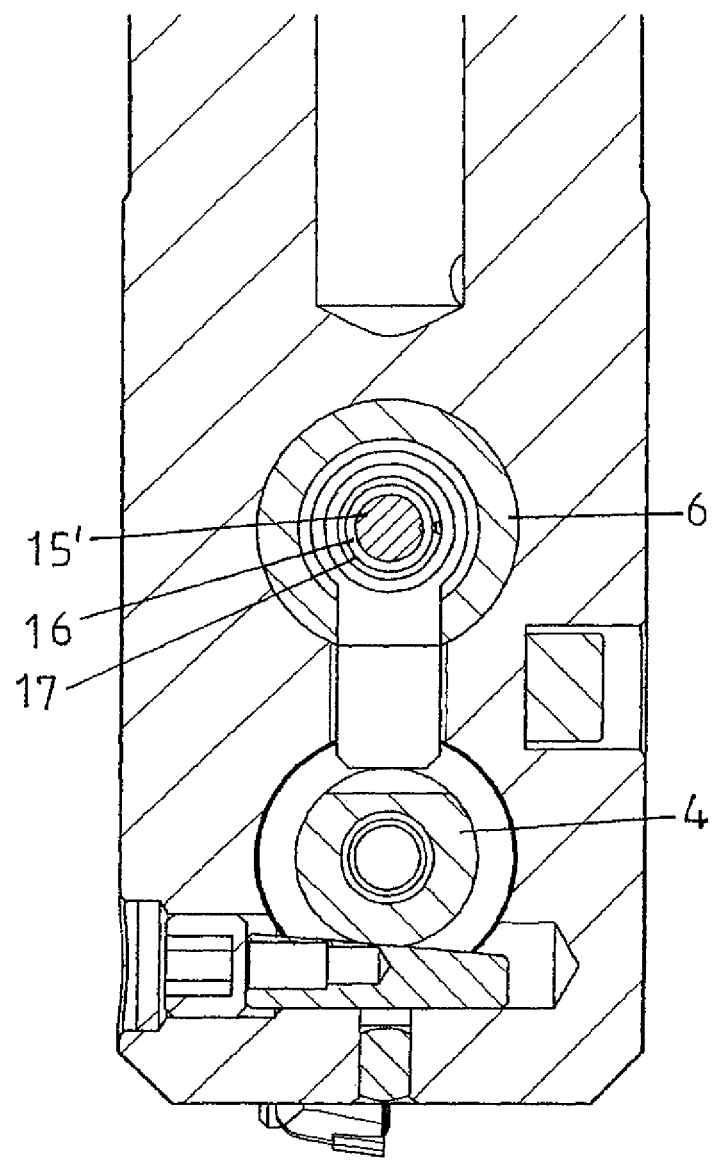
Figure 10:
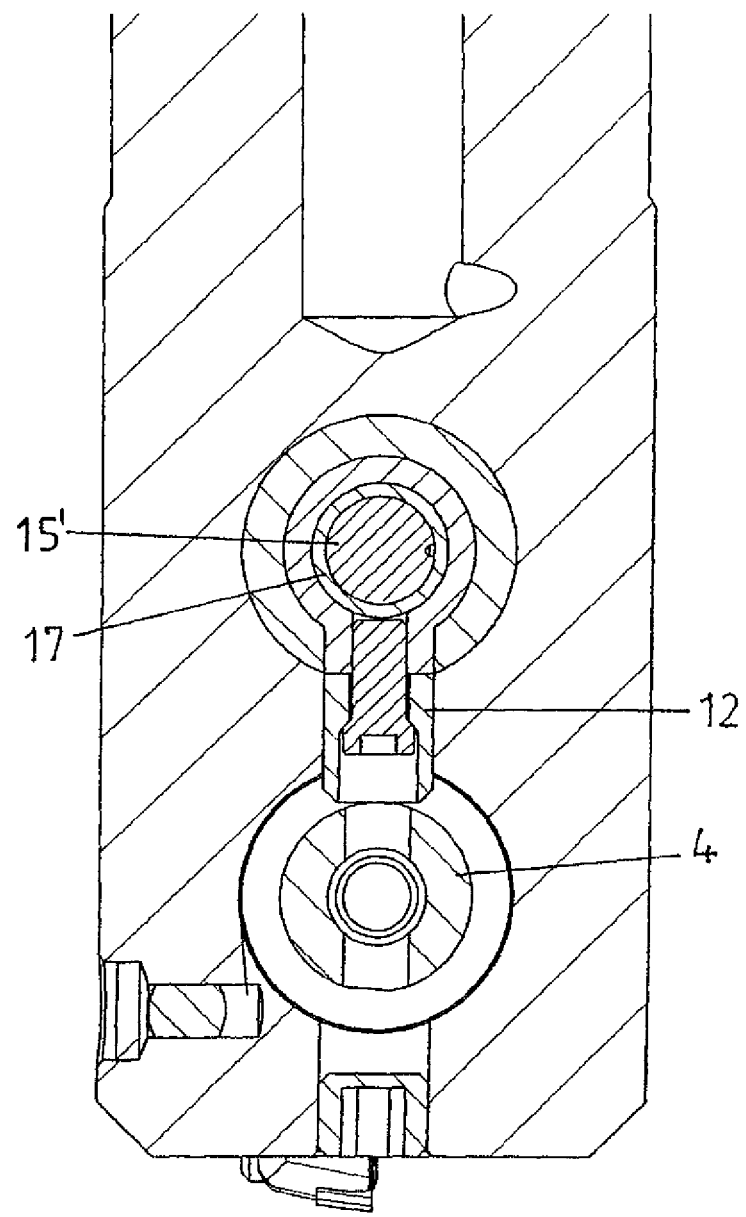
Figure 11:
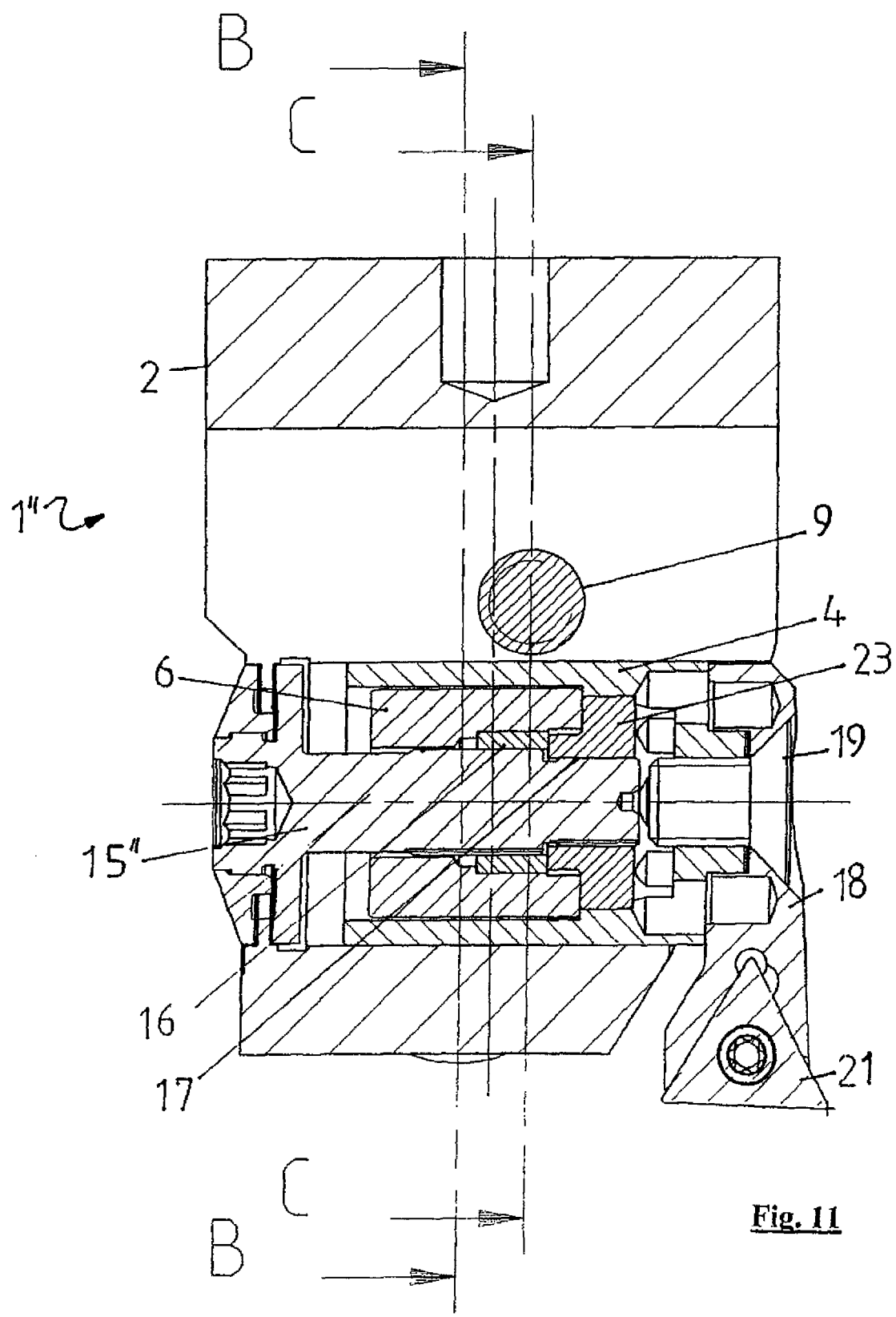
Figure 12:
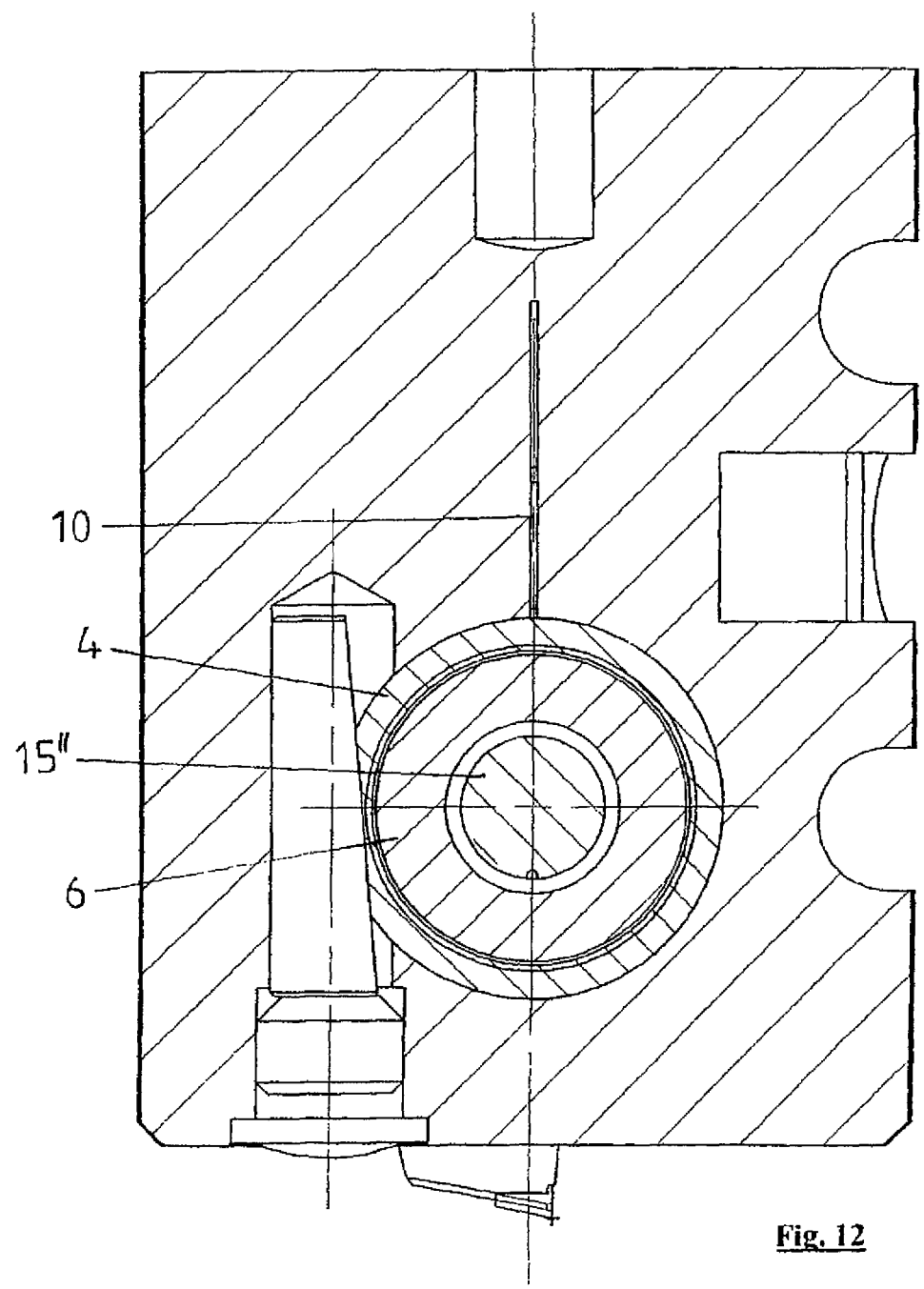
Figure 13:
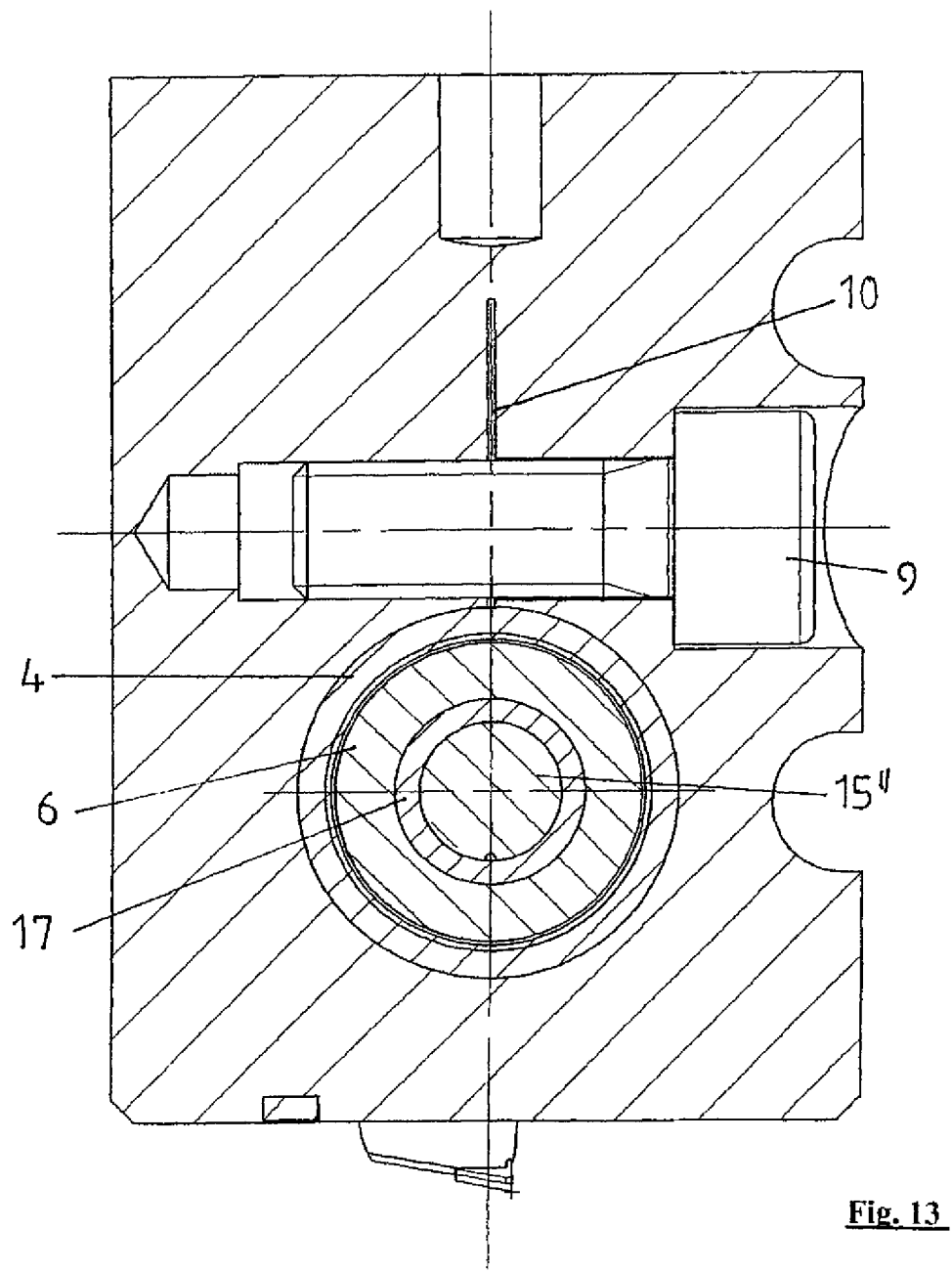

Further advantages, features and possible uses of the present invention will be apparent from the description hereinafter of a preferred embodiment and the accompanying Figures in which:

FIG. 1 shows a longitudinal section along line A-A in FIG. 2 of a first embodiment of a boring tool according to the invention, FIG. 2 shows a cross-sectional view along line B-B in FIG. 1, FIG. 3 shows a plan view of the first embodiment of the boring tool according to the invention, FIG. 4 shows a sectional view along line E-E in FIG. 3, FIG. 5 shows a sectional view along line D-D in FIG. 3, FIG. 6 shows a sectional view along line C-C in FIG. 3, which substantially corresponds to FIG. 2, FIG. 7 shows a longitudinal section of a second embodiment of a boring tool according to the invention, FIG. 8 shows a sectional view along line B-B in FIG. 7, FIG. 9 shows a sectional view along line C-C in FIG. 7, FIG. 10 shows a sectional view along line D-D in FIG. 7, FIG. 11 shows a longitudinal section of a third embodiment of a boring tool according to the invention, FIG. 12 shows a sectional view along line B-B in FIG. 11, and FIG. 13 shows a sectional view along line C-C in FIG. 11.

FIG. 1 shows a longitudinal section through a first embodiment by way of example of the boring tool 1 according to the invention. The boring tool 1 comprises a main tool body 2 having a shank portion 3 which is provided for connecting the boring tool to a suitable machine. The boring tool 1 also has a tool holder 4 to which a cutting bit holder 18 with a cutting bit seat 5 is mounted by means of the screw 19. The tool holder has a screwthreaded bore and is itself arranged within the bore 8. The tool holder can be moved in a radial direction, that is to say towards the right or the left in FIG. 1, by means of the screw element 15 which engages with its screwthread flight 17 into the screwthreaded bore in the tool holder 4. That measure makes it possible to precisely adjust the machining radius of a cutting bit accommodated on the cutting bit seat 5. The screw element can also be connected to a scale disk or can have a scale arrangement.

In addition provided in the main tool body 2 is a further bore 7 in which a counterweight 6 is disposed. The counterweight 6 has a through bore into which a guide bolt 20 engages, with the cover 22. That ensures that the cover 22 is securely fixed to the tool.

To prevent the counterweight 6 from rotating about the longitudinal axis of the guide bolt 20 the counterweight has a guide groove 14 into which engages a guide pin 13 arranged in the main body 2. Connected to the counterweight 6 is a connecting element 12 which in turn also has a screwthreaded bore into which the screw element 15 engages. The screw element 15 has two different screwthreads 16 and 17. The two screwthreads are opposite so that upon rotation of the screw element 15 the tool holder 4 together with the cutting bit holder 18 and the cutting bit fitted therein is moved in the one (radial) direction while the connecting element 12 and the counterweight 6 connected thereto is moved in the other opposite (radial) direction.

That affords automatic balancing of the boring tool at any set diameter of the tool holder 4.

The arrangement of the tool holder 4 on the one hand and the connecting element 12 on the other hand on the screw element 15 with a double screwthread is shown in FIG. 2 illustrating a section in the transverse direction through the boring tool 1 along B-B in FIG. 1. It will be seen from FIG. 2 that the boring tool is of a substantially circular cross-section. In addition FIG. 2 shows line A-A illustrating the sectional plane in FIG. 1.

FIG. 3 shows a plan view of the first embodiment of the boring tool 1 according to the invention. FIG. 4 shows a sectional view along line E-E in FIG. 3. FIG. 4 shows a section perpendicular to the sectional view in FIG. 1.

FIG. 5 is a sectional view along D-D in FIG. 3 while FIG. 6 is a sectional view along C-C in FIG. 3.

It can be particularly clearly seen from FIGS. 1 and 4 that there is provided a clamping screw 9 engaging into a screwthreaded bore 11 in the main tool body 2. When the clamping screw 9 is tightened that leads to elastic deformation of the entire main tool body so that both the counterweight 6 and also the tool holder 4 are clamped fast in their respective bores 7 and 8. That ensures that during the machining operation of the boring tool, no unintentional movement of the counterweight 6 and/or the tool holder 4 occurs.

FIG. 7 shows a longitudinal sectional view of a second embodiment of the boring tool 1' according to the invention.

As far as possible the same references have been used as in FIGS. 1 through 6 to identify identical components in both embodiments.

The following description of the second embodiment is essentially restricted to the differences between the two embodiments. In regard to the arrangement and mode of operation of the elements, which is common to both embodiments, attention is directed to the description relating to FIGS. 1 through 6.

The main tool body 2 can be seen in FIG. 7. The main tool body 2 has two blind bores 7 and 8 extending in substantially mutually parallel relationship. Arranged in the blind bore 8 is the tool holder 4, to which a cutting bit holder 18 is fixed by means of the screw 19, the holder 18 holding the cutting bit 21 in a cutting bit seat 5 provided for same.

A counterweight 6 is arranged in the other blind bore 7. The counterweight 6 has a screwthreaded through bore into which the screw element 15' engages. The screw element 15' has two different screwthreads 16 and 17. The counterweight 6 comes into engagement with the screwthread portion 16. A connecting element 12 which at the same time is connected to the tool holder 4 comes into engagement with the screwthread portion 17.

When now the screw element 15' is rotated, that provides that on the one hand the counterweight 6 is moved in the one direction by virtue of the connection between the screw element 15' and the counterweight 6 by way of the screw flight 16 while the tool holder portion 4 connected to the connecting element 12 is moved in the other direction by virtue of the connection between the connecting element 12 and the screw element 15' by way of the other screw flight 17. Thus by rotation of the screw 15' it is possible to displace the tool holder 4 and therewith the cutting bit 21 in the radial direction. At the same time the opposite movement of the counterweight 6 provides that the boring tool 1' overall always remains balanced.

FIGS. 8 through 10 show sections along lines B-B, C-C and D-D respectively.

It can be seen in particular from FIG. 8 that, similarly to the first embodiment, there is a clamping screw 9 engaging into a corresponding screwthreaded bore 11 in the main tool body 2. When the clamping screw 9 is tightened that results in elastic deformation of the main tool body 2 by virtue of a slotted configuration thereof, the consequence thereof being that the tool holder 4 on the one hand and the counterweight 6 on the other hand are braced in the bores 7 and 8. It will be clearly seen that the clamping device 9 is in direct contact neither with the tool holder 4 nor the counterweight 6. That ensures that the clamping force acts on both movable parts, the tool holder 4 and the counterweight 6.

FIG. 11 shows a longitudinal section of a third embodiment of the boring tool according to the invention. Also shown are section lines B-B and C-C indicating the sectional views of FIGS. 12 and 13 respectively.

As far as possible, the same references have been used to denote the same components which are common to all embodiments. The following description of the third embodiment is primarily concentrated on the differences between the third embodiment and the above-described first and second embodiments. In regard to the function of the features common to all embodiments, attention is directed to the description relating to the preceding embodiments.

The boring tool 1" shown in FIG. 11 has a main tool body 2. Introduced into the main tool body 2 is a bore in which both the tool holder 4 and also the counterweight 6 are fitted, on the screw element 15". Once again the screw element 15" has two opposite screwthreads so that, upon rotation of the screw element 15″, that involves for example a displacement of the tool holder 4 together with the cutting bit holder 18 which is fixed to the tool holder 4 by means of the screw 19 and in which the cutting bit 21 is fitted, in the radial direction outwardly, that is to say towards the right in FIG. 11, while the counterweight 6 is moved towards the left in FIG. 11 so that the boring tool is balanced at any time.

Arranging the counterweight 6 and the tool holder 4 on an axis affords various advantages. On the one hand, that means that only one corresponding bore has to be provided in the main tool body 2, which leads to higher stability for the boring tool 1″. On the other hand the boring tool 1″ can be of a markedly more compact structure.

In addition arranging the counterweight 6 and the tool holder 4 on an axis ensures that the moments of force in the tool are reduced.

In the illustrated embodiment the counterweight 6 is made from a material which is of higher density than the material from which the tool holder 4 is made. As generally the tool holder 4 together with the cutting bit holder 18 and the cutting bit 21 is of comparatively large dimensions, the choice of a material of higher density for the counterweight 6 means that it can be of smaller dimensions, which also leads to the boring tool 1″ being of a more compact structure.

FIG. 11 shows a clamping element 9. As can be seen from FIGS. 12 and 13 the main tool body 2 is provided with a slot 10 so that when the clamping screw 9 is tightened the main tool body is elastically deformed and the counterweight and possibly also the tool holder are braced in the main tool body 2. In this embodiment also the clamping screw 9 does not come directly into engagement with the counterweight 6 or the tool holder 4.

In addition there is basically the possibility of making various tool holders 4 and/or cutting bit holders 18 available, which are admittedly each of the same weight but are of a different configuration in terms of arrangement so that the possible adjustable radius of the cutting bit 21 is increased.

LIST OF REFERENCES 1, 1', 1″ boring tool
2 main tool body
3 shank
4 tool holder
5 cutting bit seat
6 counterweight
7, 8 bore
9 clamping device
10 slot
11 screwthreaded bore
12 connecting element
13 guide pin
14 guide groove
15, 15', 15″ screw element
16,17 screwthread flight
18 cutting bit holder
19 cutting bit holder clamping screw
20 guide bolt
21 cutting bit
22 cover
23 bush

The invention claimed is:

1. A boring tool comprising a main tool body and a tool holder which is adjustable relative thereto, as well as a counterweight coupled to the tool holder in such a way that upon a movement of the tool holder in one direction a movement of the counterweight occurs substantially in the opposite direction,
   wherein both the tool holder and also the counterweight are respectively arranged at least in part in two separate bores in the main tool body,
   wherein the tool holder and the counterweight are connected together by way of a connecting element,
   wherein the boring tool comprises a screw element having two different screwthreads, where a first screwthread is connected to the connecting element and a second screwthread is connected either to the tool holder or to the counterweight and where the screwthreads are opposite so that upon rotation of the screw element the connecting element is moved in one direction, while the tool holder or the counterweight connected to the second screwthread is moved in the opposite direction, and
   wherein the main tool body has a clamping device, by means of which the main tool body can be elastically deformed so that the clamping force acts on both movable parts, the tool holder and the counterweight, so that both the tool holder and also the counterweight are each clamped in the bore.

2. A boring tool as set forth in claim 1, wherein the main tool body has a slot and the main tool body can be elastically deformed by means of the clamping device in such a way that the slot becomes narrower.

3. A boring tool as set forth in claim 1, wherein the clamping device comprises a clamping screw engaging into a screwthreaded bore in the main tool body.

4. A boring tool as set forth in claim 1, wherein the clamping device is not in direct contact either with the tool holder or with the counterweight.

5. A boring tool as set forth in claim 1, wherein the main tool body has a slot and the main tool body can be elastically deformed by means of the clamping device in such a way that the slot becomes narrower and wherein the connecting element is at least partially arranged in the slot.

6. A boring tool as set forth claim 1, wherein there is provided a guide means, for guiding the counterweight in the bore.

7. A boring tool as set forth in claim 6, wherein the guide means comprises a guide opening and a guide projection, wherein the guide opening is provided on one of the elements being the counterweight or the main tool body, and the guide projection is arranged on the other element.

8. A boring tool as set forth in claim 6, wherein the guide means comprises a guide bolt arranged within a bore in the counterweight.

9. A boring tool as set forth in claim 1, wherein the second screwthread is in engagement with the tool holder and the first screwthread is in engagement with the connecting element.

10. A boring tool as set forth in claim 1, wherein the first screwthread is in engagement with the connecting element and the second screwthread is in engagement with the counterweight.

11. A boring tool as set forth in claim 1, wherein the tool holder and the counterweight comprise materials of different density.

12. A boring tool as set forth in claim 1, wherein the material of the counterweight is of a higher density than the material of the tool holder.

13. A boring tool as set forth in claim 1, wherein the two separate bores extend in substantially mutually parallel relationship in the main tool body.

14. A boring tool as set forth in claim 7, wherein the guide opening is a guide groove, the guide projection is a guide pin, and wherein the guide opening is provided on the counterweight and the guide projection is arranged on the other element.

* * * * *